United States Patent
Takashima et al.

(10) Patent No.: US 11,905,486 B2
(45) Date of Patent: Feb. 20, 2024

(54) VISCOSITY INDEX IMPROVER COMPOSITION AND LUBRICATING OIL COMPOSITION

(71) Applicant: IDEMITSU KOSAN CO.,LTD., Chiyoda-ku (JP)

(72) Inventors: Yoriyuki Takashima, Ichihara (JP); Taeko Nakano, Urayasu (JP); Koki Hirano, Ichihara (JP); Motoharu Ishikawa, Chiba (JP)

(73) Assignee: IDEMITSU KOSAN CO., LTD., Chiyoda-ku (JP)

( * ) Notice: Subject to any disclaimer, the term of this patent is extended or adjusted under 35 U.S.C. 154(b) by 0 days.

(21) Appl. No.: 17/761,862

(22) PCT Filed: Sep. 24, 2020

(86) PCT No.: PCT/JP2020/036145
§ 371 (c)(1),
(2) Date: Mar. 18, 2022

(87) PCT Pub. No.: WO2021/060422
PCT Pub. Date: Apr. 1, 2021

(65) Prior Publication Data
US 2022/0372394 A1  Nov. 24, 2022

(30) Foreign Application Priority Data
Sep. 24, 2019  (JP) ................. 2019-173571

(51) Int. Cl.
*C10M 145/14* (2006.01)
*C08F 220/18* (2006.01)
(Continued)

(52) U.S. Cl.
CPC ..... *C10M 145/14* (2013.01); *C08F 220/1804* (2020.02); *C08F 220/1812* (2020.02);
(Continued)

(58) Field of Classification Search
CPC .............. C10M 145/14; C10M 143/12; C10M 169/041; C10M 2205/06; C10M 2209/084;
(Continued)

(56) References Cited

U.S. PATENT DOCUMENTS 5,565,130 A    10/1996  Omeis et al.
2012/0302476 A1*  11/2012  Koschabek ........ C10M 169/041
                                                526/260

(Continued)

FOREIGN PATENT DOCUMENTS

CN    106459821 A    2/2017
CN    107406789 A    11/2017
(Continued)

OTHER PUBLICATIONS

Combined Chinese Office Action and Search Report dated Dec. 5, 2022 in Chinese Patent Application No. 202080065583.X, citing references 15 and 16 therein, 10 pages.

(Continued)

*Primary Examiner* — Ellen M McAvoy
(74) *Attorney, Agent, or Firm* — Oblon, McClelland, Maier & Neustadt, L.L.P.

(57) ABSTRACT

An object is to provide a viscosity index improver composition that is capable of properly regulating the HTHS viscosity in the effective temperature range of a lubricating oil composition to a lower range, and a lubricating oil composition containing the viscosity index improver composition, and the viscosity index improver composition contains a comb-shaped polymer (A) containing a structural unit derived from a macromonomer (α) and a structural unit derived from a particular monomer (A1), the macromonomer (α) having a (meth)acryloyl group at one end, and (Continued)

having a structural unit derived from a monomer (α1) selected from butadiene and hydrogenated butadiene.

8 Claims, 2 Drawing Sheets

(51) Int. Cl.
| | |
|---|---|
| *C08F 220/28* | (2006.01) |
| *C08F 290/04* | (2006.01) |
| *C10M 143/12* | (2006.01) |
| *C10M 169/04* | (2006.01) |
| *C10N 20/00* | (2006.01) |
| *C10N 30/00* | (2006.01) |
| *C10N 40/25* | (2006.01) |
| *C10N 20/02* | (2006.01) |
| *C10N 20/04* | (2006.01) |

(52) U.S. Cl.
CPC .... *C08F 220/1818* (2020.02); *C08F 220/281* (2020.02); *C08F 290/048* (2013.01); *C10M 143/12* (2013.01); *C10M 169/041* (2013.01); *C10M 2205/06* (2013.01); *C10M 2209/084* (2013.01); *C10N 2020/02* (2013.01); *C10N 2020/04* (2013.01); *C10N 2020/071* (2020.05); *C10N 2030/54* (2020.05); *C10N 2040/255* (2020.05)

(58) Field of Classification Search
CPC .......... C08F 220/1804; C08F 220/1812; C08F 220/1818; C08F 220/281; C08F 290/048; C10N 2020/04
USPC ........................................................ 508/469
See application file for complete search history.

(56) References Cited

U.S. PATENT DOCUMENTS

| | | | | |
|---|---|---|---|---|
| 2013/0196888 | A1* | 8/2013 | Truong-Dinh | ....... C10M 161/00 508/474 |
| 2016/0145524 | A1* | 5/2016 | Gelder | ................. C10M 119/12 508/469 |
| 2017/0096616 | A1* | 4/2017 | Suetsugu | ............. C10M 143/10 |
| 2017/0137732 | A1 | 5/2017 | Utaka | |
| 2017/0298287 | A1* | 10/2017 | Tamura | ................. C10M 133/44 |
| 2018/0245014 | A1 | 8/2018 | Nakada et al. | |
| 2019/0211281 | A1 | 7/2019 | Imaizumi et al. | |
| 2020/0325411 | A1* | 10/2020 | Oki | ....................... C10M 135/18 |
| 2020/0339903 | A1* | 10/2020 | Oki | ....................... C10M 145/14 |

FOREIGN PATENT DOCUMENTS

| | | |
|---|---|---|
| EP | 0 621 293 A1 | 10/1994 |
| JP | 6-306130 A | 11/1994 |
| JP | 2017-31400 A | 2/2017 |
| JP | 2019-23270 A | 2/2019 |
| JP | 2020-164497 A | 10/2020 |
| WO | WO 2019/012031 A1 | 1/2019 |

OTHER PUBLICATIONS

Combined Chinese Office Action and Search Report dated Jan. 28, 2023 in Chinese Patent Application No. 202080065583 (with unedited computer-generated English Translation), 37 pages.

International Search Report dated Nov. 24, 2020 in PCT/JP2020/036145 filed on Sep. 24, 2020 (citing references AA-AB, and AO-AP, therein, 2 pages.

Notice of Reasons for Refusal dated Aug. 29, 2023 in Japanese Patent Application No. 2021-549010 (with English machine translation), 8 pages.

Extended European Search Report dated Jul. 18, 2023, in corresponding European Patent Application No. 20870108.6 citing documents 15 and 16 therein, 7 pages.

Chinese Office Action dated Nov. 1, 2023 issued in Chinese Application No. 202080065583.X filed on Sep. 24, 2020, with English translation, total 19 pages.

* cited by examiner

VISCOSITY INDEX IMPROVER COMPOSITION AND LUBRICATING OIL COMPOSITION

TECHNICAL FIELD

The present invention relates to a viscosity index improver composition and a lubricating oil composition.

BACKGROUND ART

In recent years, the fuel consumption saving of vehicles, such as automobiles, is being strongly demanded from the standpoint of effective utilization of the petroleum resources and reduction of the $CO_2$ emissions. Accordingly, the fuel consumption saving is also increasingly demanded for lubricating oil compositions used in engines of vehicles, such as automobiles.

One example of the methods for fuel consumption saving is a method of lowering the viscosity of the lubricating oil composition for reducing the viscosity resistance. Examples of the known method therefor include a method of adding a viscosity index improver composition to a lubricating oil composition, so as to decrease the HTHS viscosity (high temperature high shear viscosity) in the effective temperature range, which more largely influences the fuel consumption.

PTL 1 describes that the HTHS viscosity of a lubricating oil composition is reduced with a viscosity index improver composition containing a polymer having an ethylenic unsaturated monomer represented by the following general formula (1) as a structural unit and a base oil, having a value (V1) obtained by dividing the 40° C. kinematic viscosity by the 100° C. kinematic viscosity in a range of 0.2 to 5.

(1)

In the general formula (1), $R^1$ represents a hydrogen atom or a methyl group, $-X^1-$ represents a group represented by $-O-$, $-O(AO)_m-$, or $-NH-$, A represents a linear or branched alkylene group having 2 to 4 carbon atoms, m represents an integer of 0 to 20, in which in the case where m is 2 or more, plural groups represented by A may be the same as or different from each other, and the $(AO)_m$ moiety may be either random bonding or block bonding, $R^2$ represents a residual group formed by removing one hydrogen atom from a hydrocarbon polymer having isobutylene and/or 1,2-butylene as an essential structural unit, and p represents a number of 0 or 1.

CITATION LIST

Patent Literature

PTL 1: JP 2017-31400 A

SUMMARY OF INVENTION

Technical Problem

According to the strong demand of fuel consumption saving for lubricating oil compositions used in vehicles, such as automobiles, it is demanded that the HTHS viscosity in the effective temperature range of a lubricating oil composition, which more largely influences the fuel consumption, is properly regulated to a lower range.

Under the circumstances, an object of the present invention is to provide a viscosity index improver composition that is capable of properly regulating the HTHS viscosity of a lubricating oil composition in the effective temperature range to a lower range, and a lubricating oil composition containing the viscosity index improver composition.

Solution to Problem

The present inventors have found that a viscosity index improver composition containing a comb-shaped polymer having a particular structure can solve the problem, and have completed the present invention.

The present invention relates to the following items [1] and [2].

[1] A viscosity index improver composition containing a comb-shaped polymer (A) containing a structural unit derived from a macromonomer (α) and a structural unit derived from a monomer (A1) represented by the following general formula (a1);

(a1)

wherein in the general formula (a1),
$R^{11}$ represents a hydrogen atom or a methyl group;
$R^{12}$ represents a single bond, $-O-$, or $-NH-$;
$R^{13}$ represents a linear alkylene group having 2 to 4 carbon atoms or a branched alkylene group having 2 to 4 carbon atoms;
m1 represents an integer of 0 to 20, in which in the case where m1 represents an integer of 2 or more, plural groups represented by $R^{13}$ may be the same as or different from each other, and the $(R^{13}O)_{m1}$ moiety may be either random copolymerization or block copolymerization; and
$R^{14}$ represents an alkyl group having 4 to 8 carbon atoms except for a n-butyl group,
the macromonomer (α) having a (meth)acryloyl group at one end, and having a structural unit derived from one or more kind of a monomer (α1) selected from butadiene and hydrogenated butadiene.

[2] A lubricating oil composition containing the viscosity index improver composition according to the item [1] and a base oil.

Advantageous Effects of Invention

According to the present invention, a viscosity index improver composition that is capable of properly regulating the HTHS viscosity of a lubricating oil composition in the effective temperature range to a lower range, and a lubricating oil composition containing the viscosity index improver composition can be provided.

DESCRIPTION OF EMBODIMENTS

Embodiments for practicing the present invention will be described in detail below.

In the description herein, a lower limit value and an upper limit value described for a preferred numeral range (for example, a range of the content) each can be independently combined. For example, from a description "preferably 10 or more, more preferably 30 or more, and further preferably 40 or more" for the lower limit value and a description "preferably 90 or less, more preferably 80 or less, and further preferably 70 or less" for the upper limit, ranges that each independently combining the lower limit value and the upper limit value may be selected for preferred ranges, such as "10 or more and 70 or less", "30 or more and 70 or less", and "40 or more and 80 or less". From the same descriptions, ranges that each is defined by one of the lower limit value and the upper limit value may also be selected therefor, such as "40 or more" and "70 or less". Furthermore, the same is applied to preferred ranges that can be selected from descriptions, such as "preferably 10 or more and 90 or less, more preferably 30 or more and 80 or less, and further preferably 40 or more and 70 or less" and "preferably 10 to 90, more preferably 30 to 80, and further preferably 40 to 70". In the description herein, for example, a description "10 to 90" has the same meaning as "10 or more and 90 or less". The values with "or more", "or less", "less than", "more than" relating to numeral ranges may be arbitrarily combined.

In the description herein, "(meth)acrylate" means both "acrylate" and "methacrylate", and the same is applied to the similar terms. For example, a "(meth)acryloyl group" means both an "acryloyl group" and a "methacryloyl group".

In the description herein, the mass average molecular weights (Mw) and the number average molecular weights (Mn) of the components are standard polystyrene conversion values measured by the gel permeation chromatography (GPC) method, and specifically mean values that are measured by the method shown in the examples.

In the description herein, a "kinematic viscosity at 40° C." may be referred to as a "40° C. kinematic viscosity". Similarly, a "kinematic viscosity at 100° C." may be referred to as a "100° C. kinematic viscosity".

Embodiments of the present invention will be described in detail below.

[Embodiment of Viscosity Index Improver Composition]

The viscosity index improver composition of the present invention contains a comb-shaped polymer (A).

In the present invention, a "comb-shaped polymer" means a polymer having a structure including plural three-way branching points on the main chain thereof, from each of which a high molecular weight side chain is branched.

The comb-shaped polymer (A) contains a structural unit derived from a macromonomer (α) and a structural unit derived from a monomer (A1) represented by the following general formula (a1);

(a1)

wherein in the general formula (a1), $R^{11}$ represents a hydrogen atom or a methyl group;

$R^{12}$ represents a single bond, —O—, or —NH—;

$R^{13}$ represents a linear alkylene group having 2 to 4 carbon atoms or a branched alkylene group having 2 to 4 carbon atoms;

m1 represents an integer of 0 to 20, in which in the case where m1 represents an integer of 2 or more, plural groups represented by $R^{13}$ may be the same as or different from each other, and the $(R^{13}O)_{m1}$ moiety may be either random copolymerization or block copolymerization; and $R^{14}$ represents an alkyl group having 4 to 8 carbon atoms except for a n-butyl group.

The macromonomer (α) has a (meth)acryloyl group at one end, and has a structural unit derived from one or more kind of a monomer (α1) selected from butadiene and hydrogenated butadiene.

The viscosity index improver composition according to one embodiment of the present invention may contain only the comb-shaped polymer (A). Accordingly, the viscosity index improver composition according to one embodiment of the present invention may contain the comb-shaped polymer (A) in an amount of 100% by mass based on the total amount (100% by mass) of the viscosity index improver composition.

The viscosity index improver composition according to one embodiment of the present invention is preferably dissolved and diluted in a diluent from the standpoint of improving the solubility to the base oil contained in the lubricating oil composition. Examples of the diluent include a solvent used in polymerization of the comb-shaped polymer (A). The solvent is preferably a mineral oil or a synthetic oil, and more preferably a mineral oil. The diluent may be used alone or as a combination of two or more kinds thereof.

In the case where the viscosity index improver composition contains the comb-shaped polymer (A) and the diluent, the content of the comb-shaped polymer (A) is preferably 5% by mass to 80% by mass, more preferably 10% by mass to 70% by mass, and further preferably 10% by mass to 50% by mass, based on the total amount (100% by mass) of the viscosity index improver composition. The content of the diluent is preferably 20% by mass to 95% by mass, more preferably 20% by mass to 90% by mass, and further preferably 50% by mass to 90% by mass, based on the total amount (100% by mass) of the viscosity index improver composition.

The viscosity index improver composition according to one embodiment of the present invention may contain an additive in such a range that does not largely impair the effects of the present invention. Examples of the additive include an antioxidant.

The content of the additive is preferably 0.01% by mass to 10% by mass, more preferably 0.05% by mass to 5.0% by mass, and further preferably 0.1% by mass to 3.0% by mass, based on the total amount (100% by mass) of the viscosity index improver composition.

The comb-shaped polymer (A) will be described in detail below.

<Embodiments of Comb-Shaped Polymer (A): Macromonomer (α) and Monomer (A1)>

The comb-shaped polymer (A) contained in the viscosity index improver composition of the present invention contains a structural unit derived from a macromonomer (α) and a structural unit derived from a monomer (A1) represented by the following general formula (a1):

(a1)

wherein in the general formula (a1), $R^{11}$ represents a hydrogen atom or a methyl group;

$R^{12}$ represents a single bond, —O—, or —NH—;

$R^{13}$ represents a linear alkylene group having 2 to 4 carbon atoms or a branched alkylene group having 2 to 4 carbon atoms;

m1 represents an integer of 0 to 20, in which in the case where m1 represents an integer of 2 or more, plural groups represented by $R^{13}$ may be the same as or different from each other, and the $(R^{13}O)_{m1}$ moiety may be either random copolymerization or block copolymerization; and $R^{14}$ represents an alkyl group having 4 to 8 carbon atoms except for a n-butyl group.

The macromonomer (α) has a (meth)acryloyl group at one end, and has a structural unit derived from one or more kind of a monomer (α1) selected from butadiene and hydrogenated butadiene.

As a result of the earnest investigations by the present inventors, it has been found that in comb-shaped polymers containing a structural unit derived from the macromonomer (α), the comb-shaped polymer (A) that contains a structural unit derived from the monomer (A1) represented by the general formula (a1) exerts an effect of properly regulating the HTHS viscosity of the lubricating oil composition in the effective temperature rang to a lower range, and thus the present invention has been completed.

In the description herein, the effective temperature range means 80° C. or a temperature range in the vicinity thereof, which assumes the practical range of engines.

In the description herein, the expression that "the HTHS viscosity is low" means that the HTHS viscosity is low in the comparison among lubricating oil compositions that are regulated to have the same 100° C. kinematic viscosity by mixing the viscosity index improver. Accordingly, in the following description, the expression that "the HTHS viscosity is regulated to a low level" means that the HTHS viscosity is regulated to a low level in the comparison among lubricating oil compositions that are regulated to have the same 100° C. kinematic viscosity by mixing the viscosity index improver.

In the general formula (a1), $R^{14}$ represents an alkyl group having 4 to 8 carbon atoms except for a n-butyl group.

In the case where $R^{14}$ represents a n-butyl group, the effects of the present invention cannot be exerted. In the case where the number of carbon atoms of $R^{14}$ is less than 4, the effects of the present invention cannot be exerted. In the case where the number of carbon atoms of $R^{14}$ is more than 8, the effect of improving a viscosity index as the viscosity index improver composition cannot be sufficiently exerted.

In the general formula (a1), $R^{14}$ preferably represents a linear alkyl group having 6 to 8 carbon atoms or a branched alkyl group having 6 to 8 carbon atoms from the standpoint of regulating the HTHS viscosity in the effective temperature range to a low level while regulating the HTHS viscosity at 150° C. to a lower level.

Specific examples of the linear alkyl group having 6 to 8 carbon atoms or the branched alkyl group having 6 to 8 carbon atoms include a n-hexyl group, a n-heptyl group, a n-octyl group, a 2-ethylhexyl group, a 2-methylpentyl group, a 2-methylheptyl group, a 2-ethylheptyl group, and a 2-ethylhexyl group. Among these, a n-hexyl group and a 2-ethylhexyl group are preferred.

In the general formula (a1), $R^{14}$ preferably represents a linear alkyl group having 4 to 5 carbon atoms or a branched alkyl group having 4 to 5 carbon atoms except for a n-butyl group, or a group having a cyclic alkyl structure having 6 to 8 carbon atoms from the standpoint of facilitating the improvement of the viscosity index while regulating the HTHS viscosity at 150° C. to a low level and regulating the HTHS viscosity in the effective temperature range to a lower level. The number of carbon atoms of the group having a cyclic alkyl structure means the total number of carbon atoms contained in the group having a cyclic alkyl structure.

The linear alkyl group having 4 to 5 carbon atoms or the branched alkyl group having 4 to 5 carbon atoms except for a n-butyl group is preferably a branched alkyl group having 4 to 5 carbon atoms from the standpoint further facilitating the exertion of the effect of improving the viscosity index while regulating the HTHS viscosity at 150° C. to a low level and regulating the HTHS viscosity in the effective temperature range to a lower level. Specifically, a branched alkyl group having 4 to 5 carbon atoms having tertiary carbon or quaternary carbon is preferred, and the group having tertiary carbon is more preferred.

Specific examples of the linear alkyl group having 4 to 5 carbon atoms or the branched alkyl group having 4 to 5 carbon atoms except for a n-butyl group include a n-pentyl group, an isobutyl group, a sec-butyl group, a tert-butyl group, a neopentyl group, an isopentyl group, a sec-pentyl group, a tert-pentyl group, and a 3-pentyl group. Among these, an isobutyl group, a sec-butyl group, a tert-butyl group, a neopentyl group, an isopentyl group, a sec-pentyl group, a tert-pentyl group, and a 3-pentyl group are preferred, and an isobutyl group is more preferred.

Specific examples of the group having a cyclic alkyl structure having 6 to 8 carbon atoms include a cyclohexyl group, a methylcyclohexyl group, an ethylcyclohexyl group, a dimethylcyclohexyl group, a cyclohexylmethyl group, a methylcyclohexylmethyl group, and a cyclohexylethyl group. Among these, a cyclohexyl group is preferred.

In the general formula (a1), $R^{11}$ preferably represents a methyl group from the standpoint of regulating the HTHS viscosity at 150° C. to a low level and facilitating the regulation of the HTHS viscosity in the effective temperature range to a lower level.

$R^{12}$ preferably represents —O— from the same standpoint.

Accordingly, the monomer (A1) preferably has an acryloyl group or a methacryloyl group, and more preferably has a methacryloyl group, as a polymerizable functional group.

m1 is preferably 0 to 5, more preferably 0 to 2, and further preferably 0, from the same standpoint.

The content of the structural unit derived from the monomer (A1) in the comb-shaped polymer (A) is preferably 60% by mass or more based on the total structural units of the comb-shaped polymer (A) from the standpoint of facilitating the exertion of the effects of the present invention.

The content of the structural unit derived from the monomer (A1) is preferably more than 60% by mass, more preferably 62% by mass or more, and further preferably 64% by mass or more, from the standpoint of further facilitating the exertion of the effects of the present invention.

The upper limit value of the content of the structural unit derived from the monomer (A1) is not particularly limited, as far as the content is in the range where the solubility in the base oil contained in the lubricating oil composition is retained, and is preferably 80% by mass or less, more preferably 75% by mass or less, and further preferably 70% by mass or less.

The structural unit derived from the monomer (A1) contained in the comb-shaped polymer (A) may be constituted by one kind alone or by two or more kinds. For example, the comb-shaped polymer (A) containing plural kinds of structural units having different kinds of $R^{14}$ in the general formula (a1) may be prepared, and thereby the viscosity index improver composition that can readily regulate the HTHS viscosity to the target range can be obtained.

The macromonomer ($\alpha$) has a (meth)acryloyl group at one end, and has a structural unit derived from one or more kind of a monomer ($\alpha$1) selected from butadiene and hydrogenated butadiene.

Accordingly, the polymer having a structural unit derived from the monomer ($\alpha$1) corresponds to the "high molecular weight side chain" described above. In the present invention, the "macromonomer" means a high molecular weight monomer having a polymerizable functional group, and the polymerizable functional group is a (meth)acryloyl group. Accordingly, the main chain of the comb-shaped polymer (A) has a structural unit derived from a (meth)acryloyl group, which is the polymerizable functional group of the macromonomer ($\alpha$). The polymerizable functional group is preferably a methacryloyl group from the standpoint of further facilitating the exertion of the effects of the present invention.

The number average molecular weight (Mn) of the macromonomer ($\alpha$) is preferably 300 or more, more preferably 500 or more, further preferably 1,000 or more, still further preferably 2,000 or more, and still more further preferably 4,000 or more, and is preferably 100,000 or less, more preferably 50,000 or less, further preferably 20,000 or less, and still further preferably 10,000 or less.

The macromonomer ($\alpha$) may have, for example, one or more kind of repeating units represented by the following general formulae (b-i) to (b-iii), in addition to the structural unit derived from the monomer (a1).

In the case where the macromonomer ($\alpha$) is a copolymer, the mode of the copolymer may be either a block copolymer or a random copolymer.

$$-(R^{b1})-\qquad\text{(b-i)}$$

$$-(R^{b2}O)-\qquad\text{(b-ii)}$$

(b-iii)

in the general formula (b-i), $R^{b1}$ represents a linear alkylene group or branched alkylene group having 1 to 10 carbon atoms. Examples thereof include a methylene group, an ethylene group, a 1,2-propylene group, a 1,3-propylene group, a pentylene group, a hexylene group, a heptylene group, an octylene group, a nonylene group, a decylene group, and a 2-ethylhexylene group.

In the general formula (b-ii), $R^{b2}$ represents a linear alkylene group or branched alkylene group having 2 to 4 carbon atoms. Examples thereof include an ethylene group, a 1,2-propylene group, a 1,3-propylene group, a 1,2-butylene group, a 1,3-butylene group, and a 1,4-butylene group.

In the general formula (b-iii), $R^{b3}$ represents a hydrogen atom or a methyl group.

$R^{b4}$ represents a linear or branched alkyl group having 1 to 10 carbon atoms. Examples thereof include a methyl group, an ethyl group, a n-propyl group, a n-butyl group, a n-pentyl group, a n-hexyl group, a n-heptyl group, a n-octyl group, a n-nonyl group, a n-decyl group, an isopropyl group, an isobutyl group, a sec-butyl group, a tert-butyl group, an isopentyl group, a tert-pentyl group, an isohexyl group, a tert-hexyl group, an isoheptyl group, a tert-heptyl group, a 2-ethylhexyl group, an isooctyl group, an isononyl group, and an isodecyl group.

In the case where plural kinds of repeating units are contained for each of the repeating units represented by the general formulae (b-i) to (b-iii), plural groups represented by each of $R^{b1}$, $R^{b2}$, $R^{b3}$, and $R^{b4}$ may be the same as or different from each other.

The content of the structural unit derived from the macromonomer ($\alpha$) in the comb-shaped polymer (A) is preferably 5% by mass to 40% by mass, more preferably 7% by mass to 25% by mass, and further preferably 8% by mass to 18% by mass, based on the total structural units of the comb-shaped polymer (A).

The structural unit derived from the macromonomer ($\alpha$) contained in the comb-shaped polymer (A) may be constituted by one kind alone or by two or more kinds.

<Embodiments of Comb-Shaped Polymer (A): Monomer (A2)>

The comb-shaped polymer (A) contained in the viscosity index improver composition according to one embodiment of the present invention preferably further contains a structural unit derived from a monomer (A2) represented by the following general formula (a2):

(a2)

wherein in the general formula (a2),
$R^{21}$ represents a hydrogen atom or a methyl group;
$R^{22}$ represents a single bond, —O—, or —NH—;
$R^{23}$ represents a linear alkylene group having 2 to 4 carbon atoms or a branched alkylene group having 2 to 4 carbon atoms;
m2 represents an integer of 1 to 20, in which in the case where m2 represents an integer of 2 or more, plural groups represented by $R^{23}$ may be the same as or different from each other, and the $(R^{23}O)_{m2}$ moiety may be either random copolymerization or block copolymerization; and
$R^{24}$ represents a linear alkyl group having 1 to 12 carbon atoms or a branched alkyl group having 1 to 12 carbon atoms.

The structural unit derived from the monomer (A2) represented by the general formula (a2) contained in the comb-shaped polymer (A) can further facilitate the improvement of the viscosity index of the base oil contained in the lubricating oil composition by the comb-shaped polymer (A). Accordingly, the effects of the present invention can be further readily exerted by properly regulating the content of the structural unit derived from the monomer (A1) represented by the general formula (a1) and the content of the structural unit derived from the monomer (A2) represented by the general formula (a2) in the comb-shaped polymer (A). Specifically, the ratio ((A1)/(A2)) of the content of the structural unit derived from the monomer (A1) and the content of the structural unit derived from the monomer (A2) in terms of mass ratio is preferably 3.0 to 17.0, more preferably 5.0 to 15.0, further preferably 6.0 to 12.0, and still further preferably 7.0 to 9.0.

In the general formula (a2), $R^{21}$ preferably represents a methyl group from the standpoint of regulating the HTHS viscosity at 150° C. to a low level and facilitating the regulation of the HTHS viscosity of the lubricating oil composition.

$R^{22}$ each independently preferably represents —O— from the same standpoint.

Accordingly, the monomer (A2) preferably has an acryloyl group or a methacryloyl group, and more preferably has a methacryloyl group, as a polymerizable functional group.

m2 is preferably 1 to 5, more preferably 1 to 2, and further preferably 1, from the same standpoint.

$R^{23}$ preferably represents a linear alkylene group having 2 to 3 carbon atoms, and more preferably a linear alkylene group having 2 carbon atoms, from the same standpoint.

$R^{24}$ preferably represents a linear alkyl group having 1 to 12 carbon atoms, preferably a linear alkyl group having 2 to 8 carbon atoms, further preferably a linear alkyl group having 2 to 6 carbon atoms, and still further preferably a n-butyl group, from the same standpoint.

The content of the structural unit derived from the monomer (A2) in the comb-shaped polymer (A) is preferably 0% by mass to 15% by mass, more preferably 3% by mass to 15% by mass, further preferably 5% by mass to 12% by mass, and still further preferably 6% by mass to 10% by mass, based on the total structural units of the comb-shaped polymer (A).

The structural unit derived from the monomer (A2) contained in the comb-shaped polymer (A) may be constituted by one kind alone or by two or more kinds.

<Embodiments of Comb-Shaped Polymer (A): Monomer (A3)>

The comb-shaped polymer (A) contained in the viscosity index improver composition according to one embodiment of the present invention preferably further contains a structural unit derived from an alkyl (meth)acrylate (A3) having a linear alkyl group having 10 to 30 carbon atoms or a branched alkyl group having 10 to 30 carbon atoms.

The structural unit derived from the monomer (A3) contained in the comb-shaped polymer (A) can further facilitate the improvement of the solubility in the base oil contained in the lubricating oil composition, and the effects of the present invention can be further readily exerted.

The alkyl (meth)acrylate (A3) is preferably an alkyl acrylate from the standpoint of regulating the HTHS viscosity at 150° C. to a low level and facilitating the regulation of the HTHS viscosity in the effective temperature range to a lower level.

The number of carbon atoms of the alkyl group of the alkyl (meth)acrylate (A3) is preferably 10 to 24, more preferably 11 to 22, and further preferably 12 to 20. The alkyl group is preferably a linear alkyl group.

The content of the structural unit derived from the monomer (A3) in the comb-shaped polymer (A) is preferably 0% by mass to 40% by mass, more preferably 10% by mass to 40% by mass, further preferably 12% by mass to 24% by mass, and still further preferably 14% by mass to 20% by mass, based on the total structural units of the comb-shaped polymer (A).

The structural unit derived from the monomer (A3) contained in the comb-shaped polymer (A) may be constituted by one kind alone or by two or more kinds.

<Embodiments of Comb-Shaped Polymer (A): Additional Monomer>

In the comb-shaped polymer (A) contained in the viscosity index improver composition according to one embodiment of the present invention, the total content of the structural unit derived from the macromonomer ($\alpha$) and the structural unit derived from the monomer (A1) is preferably 65% by mass or more, more preferably 70% by mass or more, and further preferably 75% by mass or more.

The comb-shaped polymer (A) contained in the viscosity index improver composition according to one embodiment of the present invention may contain one or more kind of a structural unit selected from the structural unit derived from the monomer (A2) and the structural unit derived from the monomer (A3). In this case, the total content of the structural unit derived from the macromonomer ($\alpha$), the structural unit derived from the monomer (A1), the structural unit derived from the monomer (A2), and the structural unit derived from the monomer (A3) is preferably 80% by mass to 100% by mass, more preferably 90% by mass to 100% by mass, and further preferably 95% by mass to 100% by mass.

The comb-shaped polymer (A) contained in the viscosity index improver composition according to one embodiment of the present invention may contain a structural unit derived from an additional monomer other than the macromonomer ($\alpha$), the monomer (A1), the monomer (A2), and the monomer (A3) in such a range that does not largely impair the effects of the present invention.

Examples of the additional monomer include one or more kind selected from styrene and an N-alkyl(meth)acrylamide.

<Property Values of Comb-Shaped Polymer (A)>

(Mass Average Molecular Weight (Mw) and Molecular Weight Distribution (Mw/Mn) of Comb-Shaped Polymer (A))

The comb-shaped polymer (A) contained in the viscosity index improver composition according to one embodiment of the present invention preferably has a mass average molecular weight (Mw) of 300,000 or more and 1,500,000 or less from the standpoint of further facilitating the exertion of the effects of the present invention.

The mass average molecular weight (Mw) of the comb-shaped polymer (A) is preferably more than 900,000 and 1,500,000 or less, more preferably 950,000 or more and 1,400,000 or less, and further preferably 1,000,000 or more and 1,350,000 or less, from the standpoint of regulating the HTHS viscosity in the effective temperature range to a low level while regulating the HTHS viscosity at 150° C. to a lower level and the standpoint of the solubility in the base oil.

The mass average molecular weight (Mw) of the comb-shaped polymer (A) is preferably 300,000 or more and 900,000 or less, more preferably 400,000 or more and 850,000 or less, and further preferably 500,000 or more and 800,000 or less, from the standpoint of improving the viscosity index and the solubility in the base oil while regulating the HTHS viscosity at 150° C. to a low level and regulating the HTHS viscosity in the effective temperature range to a lower level.

The comb-shaped polymer (A) contained in the viscosity index improver composition according to one embodiment of the present invention preferably has a molecular weight distribution (Mw/Mn) of 1.2 or more and 3.7 or less from the standpoint of further facilitating the exertion of the effects of the present invention.

The molecular weight distribution (Mw/Mn) of the comb-shaped polymer (A) may be 2.5 or more and 3.7 or less, may be 2.55 or more and 3.65 or less, and may be 2.60 or more and 3.60 or less, in the case where the HTHS viscosity in the effective temperature range is regulated to a low level while regulating the HTHS viscosity at 150° C. to a lower level.

The molecular weight distribution (Mw/Mn) of the comb-shaped polymer (A) is preferably 1.2 or more and 2.0 or less, more preferably 1.25 or more and 1.95 or less, and further preferably 1.30 or more and 1.90 or less, from the standpoint of improving the viscosity index while regulating the HTHS viscosity at 150° C. to a low level and regulating the HTHS viscosity of the lubricating oil composition in the effective temperature range to a lower level.

In the description herein, the mass average molecular weight (Mw) and the number average molecular weight (Mn) of the comb-shaped polymer (A) can be measured by the method shown in the examples described later.

(Glass Transition Temperature of Homopolymer of Structural Unit Derived from Monomer (A1))

The comb-shaped polymer (A) contained in the viscosity index improver composition of the present invention contains the structural unit derived from the monomer (A1) represented by the general formula (a1).

A homopolymer formed of the structural unit derived from the monomer (A1) represented by the general formula (a1) preferably has a glass transition temperature (Tg) of 10° C. or less from the standpoint of regulating the HTHS viscosity in the effective temperature range to a low level while regulating the HTHS viscosity at 150° C. to a lower level. The glass transition temperature (Tg) is preferably more than 20° C., more preferably 30° C. or more, further preferably 40° C. or more, and still further preferably 50° C. or more, from the standpoint of improving the viscosity index while regulating the HTHS viscosity at 150° C. to a low level and regulating the HTHS viscosity in the effective temperature range to a lower level.

In the description herein, the glass transition temperature (Tg) of the homopolymer can be measured by the differential scanning calorimetry (DSC) or the dynamic viscoelasticity measurement (DMA).

<Synthesis Method of Comb-Shaped Polymer (A)>

The comb-shaped polymer (A) can be obtained, for example, through radical polymerization of the macromonomer (α) and the monomer (A1). The comb-shaped polymer (A) can be obtained preferably through radical polymerization of the macromonomer (α) and the monomer (A1), and also one or more kind of a monomer selected from the monomer (A2), the monomer (A3), and the additional monomer.

The polymerization method used may be a known method, such as a solution polymerization method, an emulsion polymerization method, a suspension polymerization method, an inverse suspension polymerization method, a thin film polymerization method, and a spray polymerization method. Among these, a solution polymerization method is preferred.

In the case where the comb-shaped polymer (A) is produced through solution polymerization, the comb-shaped polymer (A) can be obtained by performing radical polymerization of the macromonomer (α) and the monomer (A1) with a polymerization initiator in a solvent. It is preferred that the comb-shaped polymer (A) can be obtained by performing radical polymerization of the macromonomer (α) and the monomer (A1), and also one or more kind of a monomer selected from the monomer (A2), the monomer (A3), and the additional monomer with a polymerization initiator in a solvent.

The solvent may be a solvent that dissolves the monomers, and examples thereof include an aromatic hydrocarbon-based solvent, such as toluene, xylene, and an alkylbenzene having 9 to 10 carbon atoms; an aliphatic hydrocarbon-based solvent having 5 to 18 carbon atoms, such as pentane, hexane, heptane, cyclohexane, and octane; an alcohol-based solvent having 3 to 8 carbon atoms, such as 2-propanol, 1-butanol, 2-butanol, and 1-octanol; a ketone-based solvent, such as methyl isobutyl ketone and methyl ethyl ketone; an amide-based solvent, such as N,N-dimethylformamide and N-methylpyrrolidone; an ester-based solvent, such as ethyl acetate, propyl acetate, and butyl acetate; an ether-based solvent, such as diethyl ether, methyl tert-butyl ether, and tetrahydrofuran; and a mineral oil or a synthetic oil described later. Among these, a mineral oil or a synthetic oil described later is preferred, and a mineral oil is more preferred.

Examples of the polymerization initiator include one or more kind selected from the group consisting of an azo-based initiator, a peroxide-based initiator, a redox-based initiator, and an organohalogen compound initiator. Among these, one or more kind selected from an azo-based initiator and a peroxide-based initiator is preferred, one or more kind selected from an azo-based initiator and an organic peroxide is more preferred, and an organic peroxide is further preferred.

Examples of the azo-based initiator include 2,2'-azobis(isobutyronitrile) (abbreviation: AIBN), 2,2'-azobis(2-methylbutyronitrile) (abbreviation: AMBN), 2,2'-azobis(2,4-dimethylvaleronitrile) (abbreviation: ADVN), 4,4'-azobis(4-cyanovaleric acid) (abbreviation: ACVA) and a salt thereof (such as a hydrochloride), dimethyl 2,2'-azobisisobutyrate, 2,2'-azobis(2-amidinopropane) hydrochloride, and 2,2'-azobis(2-methyl-N-(2-hydroxyethyl)propionamide).

Examples of the peroxide-based initiator include an inorganic peroxide and an organic peroxide.

Examples of the inorganic peroxide include hydrogen peroxide, ammonium persulfate, potassium persulfate, and sodium persulfate.

Examples of the organic peroxide include benzoyl peroxide, di-tert-butyl peroxide, cumene hydroperoxide, succinic peroxide, di(2-ethoxyethyl) peroxydicarbonate, tert-butyl peroxypivalate, tert-hexyl peroxypivalate, tert-butyl peroxyneoheptanoate, tert-butyl peroxyneodecanoate, tert-butyl peroxy-2-ethylhexanoate, tert-butyl peroxyisobutyrate, tert-amyl peroxy-2-ethylhexanoate, 1,1,3,3-tetramethylbutyl peroxy-2-ethylhexanoate, dibutyl peroxytrimethyladipate, 2,2-bis(4,4-di-tert-butylperoxycyclohexyl)propane, and lauryl peroxide.

Examples of the redox-based initiator include combinations of a reducing agent, such as a sulfite or a bisulfite of an alkali metal (e.g., ammonium sulfite and ammonium bisulfite), ferrous chloride, ferrous sulfate, and ascorbic acid, and an oxidant, such as a persulfate of an alkali metal, ammonium persulfate, hydrogen peroxide, and an organic peroxide.

In the radical polymerization, a known chain transfer agent may be used depending on necessity for such purposes as regulating the properties, such as the molecular weight, of the comb-shaped polymer (A).

Examples of the chain transfer agent include a mercaptan compound, a thiocarboxylic acid compound, a secondary alcohol compound, such as isopropanol, an amine compound, such as dibutylamine, a hypophosphite compound, such as sodium hypophosphite, a chlorine-containing compound, and an alkylbenzene compound.

Examples of the mercaptan compound include an alkylmercaptan compound having an alkyl group having 2 to 20 carbon atoms, such as n-butylmercaptan, isobutylmercaptan, n-octylmercaptan, n-dodecylmercaptan, sec-butylmercaptan, tert-butylmercaptan, and tert-dodecylmercaptan; and a hydroxy group-containing mercaptan compound, such as mercaptoethanol and mercaptopropanol.

Examples of the thiocarboxylic acid compound include thioglycolic acid and thiomalic acid.

The amounts of the polymerization initiator and the chain transfer agent used may be appropriately selected in consideration of the properties of the target polymer (such as the regulation of the molecular weight).

Examples of the method for polymerization control include an adiabatic polymerization method and a temperature programmed polymerization method. The reaction temperature in polymerization is preferably 30 to 140° C., more preferably 50 to 130° C., and further preferably 70° C. to 120° C.

In addition to the polymerization initiation with heat, a method of initiating polymerization through irradiation of a radioactive ray, an electron beam, an ultraviolet ray, or the like may also be used. A temperature programmed polymerization method is preferred, and a solution polymerization method with temperature programming is more preferred.

In the case where copolymerization is performed, either random addition polymerization or alternating copolymerization may be employed, and either graft copolymerization or block copolymerization may be employed.

[Embodiments of Lubricating Oil Composition]

The lubricating oil composition of the present invention contains the viscosity index improver composition described above and a base oil.

The viscosity index improver composition contained in the lubricating oil composition can regulate the HTHS viscosity at 150° C. to a low level and can also regulate the HTHS viscosity in the effective temperature range to a lower level.

Specific embodiments and preferred embodiments of the viscosity index improver composition have been described above, and further explanation therefor is omitted herein.

<Base Oil>

The base oil used in the lubricating oil composition is not particularly limited, and an arbitrary one may be selected therefor from mineral oils and synthetic oils having been used as a base oil of a lubricating oil.

Examples of the mineral oil include an oil obtained by subjecting a lubricating oil fraction obtained through distillation under reduced pressure of an atmospheric residue obtained through atmospheric distillation of a crude oil, to one or more kind of a process of, preferably all the processes of: a solvent deasphalting process; at least one kind of a process of solvent extraction and hydrocracking; at least one kind of a dewaxing process of solvent dewaxing and catalytic dewaxing; a hydrorefining process; and the like, and an oil obtained through isomerization of mineral wax. Among these, an oil processed through hydrorefining is preferred.

Examples of the synthetic oil include a poly-α-olefin, such as an α-olefin homopolymer and a copolymer, such as an ethylene-α-olefin copolymer; an ester, such as a polyol ester, a dibasic acid ester, and a phosphate ester; an ether, such as polyphenyl ether; a polyglycol; an alkylbenzene; an alkylnaphthalene; and a GTL base oil produced through hydroisomerization dewaxing of residual wax in the GTL process (gas-to-liquid wax).

The base oil may be used alone or as a combination of two or more kinds thereof.

As for the base oil contained in the lubricating oil composition, in the case where a mineral oil or a synthetic oil is used as the solvent used in the polymerization of the comb-shaped polymer (A) contained in the viscosity index improver composition, and the mineral oil or the synthetic oil used as the polymerization solvent is added directly to the lubricating oil composition, the mineral oil or the synthetic oil used as the polymerization solvent is assumed to be a kind of the base oil contained in the lubricating oil composition. Similarly, in the case where the viscosity index improver composition as one embodiment of the present invention contains a mineral oil or a synthetic oil as a diluent, and the mineral oil or the synthetic oil used as the diluent is added directly to the lubricating oil composition, the mineral oil or the synthetic oil used as the diluent is assumed to be a kind of the base oil contained in the lubricating oil composition.

While the viscosity of the base oil is not particularly limited, the 100° C. kinematic viscosity is preferably 2 mm$^2$/s to 30 mm$^2$/s, more preferably 2 mm$^2$/s to 25 mm$^2$/s, further preferably 2 mm$^2$/s to 20 mm$^2$/s, and still further preferably 2.5 mm$^2$/s to 20 mm$^2$/s. In the case where the 100° C. kinematic viscosity is 2 mm$^2$/s or more, the vaporization loss can be readily suppressed, and in the case where the 100° C. kinematic viscosity is 30 mm$^2$/s or less, the power loss due to the viscous resistance can be suppressed to provide the fuel efficiency improving effect.

The viscosity index of the base oil is preferably 50 or more, more preferably 80 or more, further preferably 100 or more, and still further preferably 105 or more. In the case where the viscosity index of the base oil is in the range, the viscosity characteristics of the lubricating oil composition can be readily improved.

The values of the 100° C. kinematic viscosity and the viscosity index of the base oil are measured and calculated by the methods shown in the examples described later.

The content of the viscosity index improver composition in the lubricating oil composition in terms of resin component is preferably 0.2% by mass to 5.0% by mass, more preferably 0.3% by mass to 3.0% by mass, and further preferably 0.4% by mass to 2.0% by mass.

<Additional Components>

The lubricating oil composition according to one embodiment of the present invention may further contain additional components other than the viscosity index improver composition and the base oil, depending on necessity, in such a range that does not impair the effects of the present invention.

Examples of the additional components include additives for a lubricating oil having been ordinarily used, and for example, include one or more kind selected from the group consisting of a metal-based detergent, an anti-wear agent, an ashless dispersant, an extreme pressure agent, a pour-point depressant, an antioxidant, an anti-foaming agent, a surfactant, a demulsifier, a friction modifier, an oiliness improver, a rust inhibitor, and a metal deactivator.

These additives for a lubricating oil may be used alone or as a combination of two or more kinds thereof.

The contents of the additives for a lubricating oil each may be properly controlled within a range that does not impair the effects of the present invention. For example, the contents of the additives for a lubricating oil each is preferably 0.001 to 15% by mass, more preferably 0.005 to 10% by mass, and further preferably 0.01 to 8% by mass, based on the total amount (100% by mass) of the lubricating oil composition.

In the case where the lubricating oil composition according to one embodiment of the present invention contains the additives for a lubricating oil other than the viscosity index improver composition described above, the total content thereof is preferably more than 0% by mass and 30% by mass or less, more preferably 0.001 to 25% by mass, further preferably 0.001 to 20% by mass, and still further preferably 0.001 to 15% by mass, based on the total amount (100% by mass) of the lubricating oil composition.

(Metal-Based Detergent)

Examples of the metal-based detergent include an organic acid metal chloride compound containing a metal atom selected from an alkali metal and an alkaline earth metal, and specific examples thereof include a metal salicylate, a metal phenolate, and a metal sulfonate, containing a metal atom selected from an alkali metal and an alkaline earth metal.

In the description herein, the "alkali metal" means lithium, sodium, potassium, rubidium, cesium, and francium.

The "alkaline earth metal" means beryllium, magnesium, calcium, strontium, and barium.

The metal atom contained in the metal-based detergent is preferably sodium, calcium, magnesium, or barium, and more preferably calcium, from the standpoint of the enhancement of the detergency at a high temperature.

The metal salicylate is preferably a compound represented by the following general formula (3), the metal phenolate is preferably a compound represented by the following general formula (4), and the metal sulfonate is preferably a compound represented by the following general formula (5).

(3)

(4)

(5)

In the general formulae (3) to (5), M represents a metal atom selected from an alkali metal and an alkaline earth metal, which is preferably sodium, calcium, magnesium, or barium, and more preferably calcium; $M^E$ represents an alkaline earth metal, which is preferably calcium, magnesium, or barium, and more preferably calcium; q represents a valence of M, which is 1 or 2; $R^{31}$ and $R^{32}$ each independently represent a hydrogen atom or a hydrocarbon group having 1 to 18 carbon atoms; S represents a sulfur atom; and r represents an integer of 0 or more, and preferably an integer of 0 to 3.

Examples of the hydrocarbon group that can be selected as $R^{31}$ and $R^{32}$ include an alkyl group having 1 to 18 carbon atoms, an alkenyl group having 1 to 18 carbon atoms, a cycloalkyl group having 3 to 18 ring carbon atoms, an aryl group having 6 to 18 ring carbon atoms, an alkylaryl group having 7 to 18 carbon atoms, and an arylalkyl group having 7 to 18 carbon atoms.

In one embodiment of the present invention, the metal-based detergent may be used alone or as a combination of two or more kinds thereof. Among these, one or more kind selected from calcium salicylate, calcium phenolate, and calcium sulfonate is preferred from the standpoint of the enhancement of the detergency at a high temperature and the standpoint of the solubility in the base oil.

In one embodiment of the present invention, the metal-based detergent may be any of a neutral salt, a basic salt, a perbasic salt, and a mixture thereof.

The total base number of the metal-based detergent is preferably 0 to 600 mgKOH/g.

In one embodiment of the present invention, in the case where the metal-based detergent is a basic salt or a perbasic salt, the total base number of the metal-based detergent is preferably 10 to 600 mgKOH/g, and more preferably 20 to 500 mgKOH/g.

In the description herein, the "base number" means the base number by the perchloric acid method measured according to the section 7 of JIS K2501:2003 "Petroleum Products and Lubricating Oil, Neutralization Number Test Method".

The lubricating oil composition according to one embodiment of the present invention contains the metal-based detergent as the additional component, the content of the metal-based detergent is preferably 0.01 to 10% by mass based on the total amount (100% by mass) of the lubricating oil composition.

The metal-based detergent may be used alone or as a combination of two or more kinds thereof. The total content in the case where two or more kinds thereof are used is the same as the content described above.

(Anti-Wear Agent)

Examples of the anti-wear agent include a sulfur-containing compound, such as zinc dialkyldithiophosphate (ZnDTP), zinc phosphate, a disulfide compound, a sulfurized olefin compound, at least one of a sulfurized fat compound and a sulfurized fat oilcompound, a sulfurized ester compound, a thiocarbonate compound, a thiocarbamate compound, and a polysulfide compound; a phosphorus-containing compound, such as a phosphite ester compound, a phosphate ester compound, a phosphonate ester compound, and an amine salt or a metal salt thereof, and a phosphorus and sulfur-containing anti-wear agent, such as a thiophosphite ester compound, a thiophosphate ester compound, a thiophosphonate ester compound, and an amine salt or a metal salt thereof.

Among these, zinc dialkyldithiophosphate (ZnDTP) is preferred.

In the case where the lubricating oil composition according to one embodiment of the present invention contains the anti-wear agent as the additional component, the content of the anti-wear agent is preferably 0.05 to 5.0% by mass based on the total amount (100% by mass) of the lubricating oil composition.

The anti-wear agent may be used alone or as a combination of two or more kinds thereof. The total content in the case where two or more kinds thereof are used is the same as the content described above.

(Ashless Dispersant)

Examples of the ashless dispersant include a succinimide, a benzylamine, a succinate ester, and boron-modified compounds thereof, and an alkenylsuccinimide and a boron-modified alkenylsuccinimide are preferred.

Examples of the alkenylsuccinimide include an alkenyl succinic monoimide represented by the following general formula (i) and an alkenyl succinic bisamide represented by the following general formula (ii).

The alkenylsuccinimide may be a modified alkenylsuccinimide obtained through reaction of the compound represented by the following general formula (i) or (ii) and one or more kind selected from an alcohol, an aldehyde, a ketone, an alkylphenol, a cyclic carbonate, an epoxy compound, an organic acid, and the like.

Examples of the boron-modified alkenylsuccinimide include a boron-modified compound of the compound represented by the following general formula (i) or (ii).

In the general formulae (i) and (ii), $R^A$, $R^{A1}$, and $R^{A2}$ each independently represent an alkenyl group having a mass average molecular weight (Mw) of 500 to 3,000 (preferably 1,000 to 3,000), and preferably a polybutenyl group or a polyisobutenyl group;

$R^B$, $R^{B1}$, and $R^{B2}$ each independently represent an alkylene group having 2 to 5 carbon atoms;

x1 represents an integer of 1 to 10, preferably an integer of 2 to 5, and more preferably 3 or 4; and x2 represents an integer of 0 to 10, preferably an integer of 1 to 4, and more preferably 2 or 3.

In one embodiment of the present invention, the ratio (B/N) of the boron atoms and the nitrogen atoms constituting the boron-modified alkenylsuccinimide is preferably 0.5 or more, more preferably 0.6 or more, further preferably 0.8 or more, and still further preferably 0.9 or more, from the standpoint of the enhancement of the detergency.

In the case where the lubricating oil composition according to one embodiment of the present invention contains the ashless dispersant as the additional component, the content of the ashless dispersant is preferably 0.1 to 20% by mass based on the total amount (100% by mass) of the lubricating oil composition.

(Extreme Pressure Agent)

Examples of the extreme pressure agent include a sulfur-based extreme pressure agent, such as a sulfide compound, a sulfoxide compound, a sulfone compound, and a thiophosphinate compound, a halogen-based extreme pressure agent, such as a chlorinated hydrocarbon, and an organometal-based extreme pressure agent. A compound that has a function of an extreme pressure agent among the aforementioned anti-wear agents may be used.

In one embodiment of the present invention, the extreme pressure agent may be used alone or as a combination of two or more kinds thereof.

In the case where the lubricating oil composition according to one embodiment of the present invention contains the extreme pressure agent as the additional component, the content of the extreme pressure agent is preferably 0.1 to 10% by mass based on the total amount (100% by mass) of the lubricating oil composition.

(Antioxidant)

The antioxidant may be an arbitrary one selected from known antioxidants having been used as an antioxidant for a lubricating oil, and examples thereof include an amine-based antioxidant, a phenol-based antioxidant, a molybdenum-based antioxidant, a sulfur-based antioxidant, and a phosphorus-based antioxidant.

Examples of the amine-based antioxidant include a diphenylamine-based antioxidant, such as diphenylamine and an alkylated diphenylamine having an alkyl group having 3 to 20 carbon atoms; and a naphthylamine-based antioxidant, such as α-naphthylamine, phenyl-α-naphthylamine, and a substituted phenyl-α-naphthylamine having an alkyl group having 3 to 20 carbon atoms.

Examples of the phenol-based antioxidant include a monophenol-based antioxidant, such as 2,6-di-tert-butylphenol, 2,6-di-tert-butyl-4-methylphenol, 2,6-di-tert-butyl-4-ethylphenol, isooctyl-3-(3,5-di-tert-butyl-4-hydroxyphenyl) propionate, and octadecyl-3-(3,5-di-tert-butyl-4-hydroxyphenyl) propionate; a diphenol-based antioxidant, such as 4,4'-methylenebis(2,6-di-tert-butylphenol) and 2,2'-methylenebis(4-ethyl-6-tert-butylphenol); and a hindered phenol-based antioxidant.

Examples of the molybdenum-based antioxidant include a molybdenum amine complex obtained through reaction of molybdenum trioxide and/or molybdic acid and an amine compound.

Examples of the sulfur-based antioxidant include dilauryl 3,3'-thiodipropionate.

Examples of the phosphorus-based antioxidant include a phosphite.

In one embodiment of the present invention, the antioxidant may be used alone or as an arbitrary combination of two or more kinds thereof, and a phenol-based antioxidant and/or an amine-based antioxidant are preferred.

In the case where the lubricating oil composition according to one embodiment of the present invention contains the antioxidant as the additional component, the content of the antioxidant is preferably 0.05 to 7% by mass based on the total amount (100% by mass) of the lubricating oil composition.

(Pour-Point Depressant)

Examples of the pour-point depressant include an ethylene-vinyl acetate copolymer, a condensate of chlorinated paraffin and naphthalene, a condensate of chlorinated paraffin and phenol, a polymethacrylate-based compound (PMA-based compound, such as a polyalkyl (meth)acrylate), a polyvinyl acetate, a polybutene, and a polyalkylstyrene, and a polymethacrylate-based compound is preferably used. The pour-point depressant may be used alone or as a combination of two or more kinds thereof.

The mass average molecular weight (Mw) of the pour-point depressant is generally 50,000 to 150,000.

In the case where the lubricating oil composition according to one embodiment of the present invention contains the pour-point depressant as the additional component, the content of the pour-point depressant is preferably 0.01 to 10% by mass based on the total amount (100% by mass) of the lubricating oil composition.

(Anti-Foaming Agent)

Examples of the anti-foaming agent include a silicone oil, such as dimethylpolysiloxane, a fluorosilicone oil, and a fluoroalkyl ether. The anti-foaming agent may be used alone or as a combination of two or more kinds thereof.

In the case where the lubricating oil composition according to one embodiment of the present invention contains the anti-foaming agent as the additional component, the content of the anti-foaming agent is preferably 0.005 to 5% by mass, and more preferably 0.005 to 0.5% by mass, based on the total amount (100% by mass) of the lubricating oil composition.

(Surfactant or Emulsifier)

Examples of the surfactant or the demulsifier include a polyalkylene glycol-based nonionic surfactant, such as a polyoxyethylene alkyl ether, a polyoxyethylene alkylphenyl ether, and a polyoxyethylene alkylnaphthyl ether. The surfactant or the demulsifier may be used alone or as a combination of two or more kinds thereof.

In the case where the lubricating oil composition according to one embodiment of the present invention contains the surfactant or the demulsifier as the additional component, the contents of the surfactant and the demulsifier each are independently 0.01 to 3% by mass based on the total amount (100% by mass) of the lubricating oil composition.

(Friction Modifier)

Examples of the friction modifier include a molybdenum-based friction modifier, such as molybdenum dithiocarbamate (MoDTC), molybdenum dithiophosphate (MoDTP), and an amine salt of molybdic acid; an ashless friction modifier, such as an aliphatic amine, a fatty acid ester, a fatty acid amine, a fatty acid, an aliphatic alcohol, and an aliphatic ether, having in the molecule thereof at least one alkyl group or alkenyl group having 6 to 30 carbon atoms; a fat or oil compound, an amine, an amide, a sulfurized ester, a phosphate ester, a phosphite ester, and phosphate ester amine salt.

In the case where the lubricating oil composition according to one embodiment of the present invention contains the friction modifier as the additional component, the content of the friction modifier is preferably 0.05 to 4% by mass based on the total amount (100% by mass) of the lubricating oil composition.

(Oiliness Improver)

Examples of the oiliness improver include an aliphatic saturated or unsaturated monocarboxylic acid, such as stearic acid and oleic acid; a polymerized fatty acid, such as a dimer acid and a hydrogenated dimer acid; a hydroxyfatty acid, such as ricinoleic acid and 12-hydroxystearic acid; an aliphatic saturated or unsaturated monoalcohol, such as lauryl alcohol and oleyl alcohol; an aliphatic saturated or unsaturated monoamine, such as stearylamine and oleylamine; an aliphatic saturated or unsaturated monocarboxylic amide, such as lauric amide and oleic amide; and a partial ester of a polyhydric alcohol, such as glycerin and sorbitol, and an aliphatic saturated or unsaturated monocarboxylic acid.

In the case where the lubricating oil composition according to one embodiment of the present invention contains the oiliness improver as the additional component, the content of the oiliness improver is preferably 0.01 to 5% by mass based on the total amount (100% by mass) of the lubricating oil composition.

(Rust Inhibitor)

Examples of the rust inhibitor include a fatty acid, an alkenylsuccinate half ester, a fatty acid soap, an alkylsulfonate salt, a polyhydric alcohol fatty acid ester, a fatty acid amine, an oxidized paraffin, and an alkyl polyoxyethylene ether.

In the case where the lubricating oil composition according to one embodiment of the present invention contains the rust inhibitor as the additional component, the content of the rust inhibitor is preferably 0.01 to 3% by mass based on the total amount (100% by mass) of the lubricating oil composition.

(Metal Deactivator)

Examples of the metal deactivator include a benzotriazole-based compound, a tolyltriazole-based compound, a thiadiazole-based compound, an imidazole-based compound, and a pyrimidine-based compound.

In the case where the lubricating oil composition according to one embodiment of the present invention contains the metal deactivator as the additional component, the content of the metal deactivator is preferably 0.01 to 5% by mass based on the total amount (100% by mass) of the lubricating oil composition.

[Properties of Lubricating Oil Composition]

<100° C. Kinematic Viscosity and Viscosity Index>

The 100° C. kinematic viscosity of the lubricating oil composition according to one embodiment of the present invention is preferably 4.0 mm$^2$/s to 16.3 mm$^2$/s, more preferably 5.0 mm$^2$/s to 16.3 mm$^2$/s, further preferably 6.1 mm$^2$/s to 12.5 mm$^2$/s, and still further preferably 6.9 mm$^2$/s to 9.3 mm$^2$/s.

The viscosity index of the lubricating oil composition according to one embodiment of the present invention is preferably 200 or more, more preferably 250 or more, and further preferably 300 or more, and is generally 400 or less.

The values of the 100° C. kinematic viscosity and the viscosity index of the lubricating oil composition are measured and calculated by the methods shown in the examples described later.

<HTHS Viscosity>

The HTHS viscosity at 150° C. of the lubricating oil composition according to one embodiment of the present invention is preferably less than 2.6 mPa more preferably less than 2.4 mPa further preferably less than 2.2 mPa and still further preferably less than 2.0 mPa from the standpoint of the enhancement of the fuel saving capability, and is preferably 1.8 mPa·s or more from the standpoint of the lubricating capability.

The viscosity index improver composition according to one embodiment of the present invention can exert a function of regulating the HTHS viscosity at 150° C. of the lubricating oil composition to preferably less than 2.6 mPa more preferably less than 2.4 mPa s, further preferably less than 2.2 mPa·s, and still further preferably less than 2.0 mPa·s.

The HTHS viscosity at 100° C. of the lubricating oil composition according to one embodiment of the present invention is preferably 3.0 to 5.0 mPa·s, more preferably 3.5 to 4.5 mPa·s, further preferably 3.5 to 4.0 mPa·s, and still further preferably 3.5 to 3.76 mPa·s, from the standpoint of the enhancement of the lubricating capability, the viscosity characteristics, and the fuel saving capability.

The HTHS viscosity at 80° C. of the lubricating oil composition according to one embodiment of the present invention is preferably 3.0 to 7.0 mPa·s, more preferably 3.5 to 6.5 mPa·s, further preferably 4.0 to 6.0 mPa·s, and still further preferably 4.5 to 5.55 mPa from the standpoint of the enhancement of the lubricating capability, the viscosity characteristics, and the fuel saving capability.

The HTHS viscosities at the temperatures of the lubricating oil composition are measured by the method shown in the examples described later.

<CCS Viscosity>

The CCS viscosity at −30° C. of the lubricating oil composition according to one embodiment of the present invention is preferably less than 1,640 mPa·s, more preferably 1,630 mPa·s or less, and further preferably 1,620 mPa·s or less, from the standpoint of the achievement of the good startability of engines, and is generally 1,400 mPa·s or more. The CCS viscosity at −35° C. of the lubricating oil composition according to one embodiment of the present invention is preferably less than 3,050 mPa·s, more preferably 3,020 mPa·s or less, and further preferably 3,000 or less, from the same standpoint, and is generally 2,700 mPa·s or more.

The CCS viscosities at the temperatures of the lubricating oil composition are measured by the method shown in the examples described later.

[Production Method of Lubricating Oil Composition]

The production method of the lubricating oil composition according to one embodiment of the present invention includes a step of mixing the viscosity index improver composition and the base oil.

In the production method, the additional components other than the viscosity index improver composition and the base oil may be mixed depending on necessity.

The viscosity index improver composition, the base oil, and the additional components are the same as those described for the lubricating oil composition, the preferred embodiments thereof are also the same, the lubricating oil composition obtained by the production method is also the same as described above, and therefore the descriptions thereof are omitted herein.

In the production method, the viscosity index improver composition, the base oil, and depending on necessity, the additional components may be mixed by any method, and the method is not limited.

[Applications of Lubricating Oil Composition]

The lubricating oil composition of the present invention can exert an excellent fuel saving capability in the use in the effective temperature range.

Accordingly, the lubricating oil composition of the present invention is preferably used as an engine oil, and is more preferably used as a gasoline engine oil.

While examples of the engine to which the lubricating oil composition of the present invention is favorably applied include an engine for a vehicle, such as an automobile, an automobile engine is preferred, and an automobile gasoline engine is more preferred. The lubricating oil composition can also be preferably applied to an engine for an automobile equipped with a hybrid mechanism.

The lubricating oil composition according to one embodiment of the present invention can be favorably applied to the purpose of a lubricating oil composition for an internal combustion engine used in an automobile and the like (i.e., an engine oil for an internal combustion engine), and can also be applied to other purposes.

[Engine]

The present invention also provides an engine including the lubricating oil composition of the present invention described above.

While examples of the engine include an engine for a vehicle, such as an automobile, an automobile engine is preferred, and an automobile gasoline engine is more preferred, as described above. An engine for an automobile equipped with a hybrid mechanism is also preferred.

The lubricating oil composition of the present invention can exert an excellent fuel saving capability in the use in the effective temperature range. Accordingly, the engine of the present invention can exert an excellent fuel saving capability in the use in the effective temperature range.

[Lubricating Method for Engine]

The present invention also provides a lubricating method for an engine, including lubricating an engine with the lubricating oil composition of the present invention described above.

While examples of the engine include an engine for a vehicle, such as an automobile, an automobile engine is preferred, and an automobile gasoline engine is more preferred, as described above. An engine for an automobile equipped with a hybrid mechanism is also preferred.

The lubricating oil composition of the present invention can exert an excellent fuel saving capability in the use in the effective temperature range. Accordingly, the lubricating method for an engine of the present invention can impart an excellent fuel saving capability to an engine in the use in the effective temperature range.

Embodiment of Present Invention Provided

According to one embodiment of the present invention, the following items [1] to [7] are provided.

[1] A viscosity index improver composition containing a comb-shaped polymer (A) containing a structural unit derived from a macromonomer (α) and a structural unit derived from a monomer (A1) represented by the following general formula (a1);

wherein in the general formula (a1),
$R^{11}$ represents a hydrogen atom or a methyl group;
$R^{12}$ represents a single bond, —O—, or —NH—;
$R^{13}$ represents a linear alkylene group having 2 to 4 carbon atoms or a branched alkylene group having 2 to 4 carbon atoms;
m1 represents an integer of 0 to 20, in which in the case where m1 represents an integer of 2 or more, plural groups represented by $R^{13}$ may be the same as or different from each other, and the $(R^{13}O)_{m1}$ moiety may be either random copolymerization or block copolymerization; and
$R^{14}$ represents an alkyl group having 4 to 8 carbon atoms except for a n-butyl group,
the macromonomer (α) having a (meth)acryloyl group at one end, and having a structural unit derived from one or more kind of a monomer (a1) selected from butadiene and hydrogenated butadiene.

[2] The viscosity index improver composition according to the item [1], wherein the comb-shaped polymer (A) has a content of the structural unit derived from the monomer (A1) of 60% by mass or more based on the total structural units.

[3] The viscosity index improver composition according to the item [1] or [2], wherein the comb-shaped polymer (A) further contains a structural unit derived from a monomer (A2) represented by the following general formula (a2);

wherein in the general formula (a2), $R^{21}$ represents a hydrogen atom or a methyl group;
$R^{22}$ represents a single bond, —O—, or —NH—;
$R^{23}$ represents a linear alkylene group having 2 to 4 carbon atoms or a branched alkylene group having 2 to 4 carbon atoms;
m2 represents an integer of 1 to 20, in which in the case where m2 represents an integer of 2 or more, plural groups represented by $R^{23}$ may be the same as or different from each other, and the $(R^{23}O)_{m2}$ moiety may be either random copolymerization or block copolymerization; and
$R^{24}$ represents a linear alkyl group having 1 to 12 carbon atoms or a branched alkyl group having 1 to 12 carbon atoms.

[4] The viscosity index improver composition according to any one of the items [1] to [3], wherein the comb-shaped polymer (A) further contains a structural unit derived from an alkyl (meth)acrylate (A3) having a linear alkyl group having 10 to 30 carbon atoms or a branched alkyl group having 10 to 30 carbon atoms.

[5] The viscosity index improver composition according to any one of the items [1] to [4], wherein the comb-shaped polymer (A) has a mass average molecular weight (Mw) of 300,000 or more and 1,500,000 or less.

[6] The viscosity index improver composition according to any one of the items [1] to [5], wherein the comb-shaped polymer (A) has a molecular weight distribution (Mw/Mn) of 1.2 or more and 3.7 or less.

[7] A lubricating oil composition containing the viscosity index improver composition according to any one of the items [1] to [6] and a base oil.

EXAMPLES

The present invention will be described more specifically with reference to examples below, but the present invention is not limited to the following examples.

[Property Values]
The measurement methods for the property values were as follows.

(1) 40° C. Kinematic Viscosity, 100° C. Kinematic Viscosity, and Viscosity Index of Base Oil
The 40° C. kinematic viscosity, the 100° C. kinematic viscosity, and the viscosity index of the base oil (A) were measured and calculated according to JIS K2283:2000.

(2) 40° C. Kinematic Viscosity, 100° C. Kinematic Viscosity, and Viscosity Index of Lubricating Oil Composition
The 40° C. kinematic viscosity, the 100° C. kinematic viscosity, and the viscosity index of the base oil (A) were measured and calculated according to JIS K2283:2000.

(3) HTHS Viscosity of Lubricating Oil Composition
The HTHS viscosity was measured at a shear rate of $10^6$/s under a temperature condition of 80° C., 100° C., or 150° C. with a TBS high temperature viscometer (tapered bearing simulator viscometer) according to ASTM D4683.

(4) CCS Viscosity (Cold Cracking Simulator)
The CCS viscosity at −30° C. and the CCS viscosity at −35° C. were measured according to JIS K2010:1993.

(5) Mass Average Molecular Weight (Mw) and Number Average Molecular Weight (Mn)
One column of "TSKguardcolumn Super HZ-L" and two columns of "TSKSuperMultipore HZ-M", produced by Tosoh Corporation were installed in "1515 Isocratic HPLC pump" and "2414 Differential Refractometer (RI) Detector", produced by Waters Corporation, in this order from the upstream side, and the mass average molecular weight and the number average molecular weight were measured under conditions of a measurement temperature of 40° C., a mobile phase of tetrahydrofuran, a flow rate of 0.35 mL/min, and a sample concentration of 1.0 mg/mL, and obtained as standard polystyrene conversion.

PRODUCTION EXAMPLES

The raw materials used in Production Example are shown below.

<Macromonomer (α)>
(One-End Methacrylated Hydrogenated Polybutadiene)
As the monomer (α1), a one-end methacrylated hydrogenated polybutadiene having a structural unit derived from hydrogenated butadiene having one methacrylated end (Kraton Liquid (registered trademark) L-1253, produced by Kuraray Co., Ltd.) was used. The mass average molecular weight was approximately 7,000, the number average molecular weight was approximately 6,800.

<Monomer (A1)>
(n-Butyl Methacrylate, Produced by Alfa Aesar)
A monomer represented by the general formula (a1), wherein $R^{11}$ was a methyl group, $R^{12}$ was —O—, m1 was 0, and $R^{14}$ was a n-butyl group, was used. A homopolymer thereof had a glass transition temperature (Tg) of 20° C. (catalog value). The monomer will be referred to as "nC4MA" in the following description. (Isobutyl Methacrylate, produced by Fujifilm Wako Pure Chemical Corporation)
A monomer represented by the general formula (a1), wherein $R^{11}$ was a methyl group, $R^{12}$ was —O—, m1 was 0, and $R^{14}$ was an isobutyl group, was used. A homopolymer thereof had a glass transition temperature (Tg) of 53° C. (catalog value). The monomer will be referred to as "iC4MA" in the following description. (Cyclohexyl Methacrylate, produced by Fujifilm Wako Pure Chemical Corporation)
A monomer represented by the general formula (a1), wherein $R^{11}$ was a methyl group, $R^{12}$ was —O—, m1 was 0, and $R^{14}$ was a cyclohexyl group, was used. A homopolymer thereof had a glass transition temperature (Tg) of 80° C. (catalog value). The monomer will be referred to as "cC6MA" in the following description. (n-Hexyl Methacrylate, produced by Sigma-Aldrich Co. LLC)
A monomer represented by the general formula (a1), wherein $R^{11}$ was a methyl group, $R^{12}$ was —O—, m1 was 0, and $R^{14}$ was a n-hexyl group, was used. A homopolymer thereof had a glass transition temperature (Tg) of 10° C. (catalog value). The monomer will be referred to as "nC6MA" in the following description. (2-Ethylhexyl Methacrylate, produced by Fujifilm Wako Pure Chemical Corporation)
A monomer represented by the general formula (a1), wherein $R^{11}$ was a methyl group, $R^{12}$ was —O—, m1 was 0, and $R^{14}$ was a 2-ethylhexyl group, was used. A homopolymer thereof had a glass transition temperature (Tg) of −10° C. (catalog value). The monomer will be referred to as "2-EHMA" in the following description.

<Monomer (A2)>
(n-Butoxyethyl Methacrylate, Produced by Kyoeisha Chemical Co., Ltd.)
Light Ester BO was used. Light Ester BO was a monomer represented by the general formula (a2), wherein $R^{21}$ was a methyl group, $R^{22}$ was —O—, $R^{23}$ was a linear alkylene group having 2 carbon atoms, m2 was 1, and $R^{24}$ was a n-$C_4H_9$ group. The monomer will be referred to as "BOEMA" in the following description.

<Monomer (A3)>
Light Ester L-7 (produced by Kyoeisha Chemical Co., Ltd.), which was a mixture of n-dodecyl methacrylate and n-tridecyl methacrylate (C12/C13=45/55%) was used. The monomer will be referred to as "nC1213MA" in the following description.

<Radical Polymerization Initiator>
Pertetra A: 2,2-bis(4,4-di-tert-butylperoxycyclohexyl)propane (produced by NOF Corporation)

AMBN: 2,2'-azobis(2-methylbutyronitrile) (produced by Fujifilm Wako Pure Chemical Corporation)

ADVN: 2,2'-azobis(2,4-dimethylvaleronitrile) (produced by Fujifilm Wako Pure Chemical Corporation)

<Base Oil for Polymerization Solvent>

A mineral oil having a 100° C. kinematic viscosity of 4.2 mm$^2$/s and a viscosity index of 123 was used.

Polymers E1, E2, E3, E4, C1, and C2 were polymerized as the comb-shaped polymer (A) using the aforementioned materials in the formulations shown in Table 1.

(1) Production Example 1 (Polymer E1)

In a four-neck separable flask equipped with a thermometer, a Dimroth condenser, a vacuum-sealed agitator, a nitrogen flow inlet, and a nitrogen flow outlet, 4.95 g of the macromonomer (α), 3.60 g of n-butoxyethyl methacrylate, 7.20 g of nC1213MA, 29.25 g of isobutyl methacrylate, 15 g of the base oil for a polymerization solvent, and 0.26 g of Pertetra A were charged, and nitrogen substitution was performed for the charged formulation. The mixture was heated under agitation under a nitrogen flow (nitrogen gas: 50 mL/min) at a bath temperature of 95 to 105° C. After 1 hour, 30 g of the base oil for a polymerization solvent was added. After further 3 hours, 135 g of the base oil for a polymerization solvent was added, followed by agitation for 2 hours. Subsequently, the bath temperature was decreased to 75 to 85° C., and 150 mL of tetrahydrofuran was added, followed by agitation at 65 to 70° C. for 2 hours. After allowing to stand overnight, the mixture was heated under agitation to 65 to 70° C. for 8 hours, to which 225 g of the base oil for a polymerization solvent was added, and tetrahydrofuran was distilled off with a Dean-Stark apparatus while increasing the bath temperature to 120 to 130° C. The unreacted monomers were distilled off under reduced pressure (0.02 MPa or less) at 120 to 130° C. over 2 hours, so as to provide a viscosity index improver composition (E-1) containing Polymer E1 shown in Table 1 below.

(2) Production Example 2 (Polymer E2)

A viscosity index improver composition (E-2) containing Polymer E2 was obtained in the same manner as in Production Example 1 except that in the charged formulation in Production Example 1, isobutyl methacrylate was changed to cyclohexyl methacrylate, and the charged amount of Pertetra A was changed to 0.23 g.

(3) Production Example 3 (Polymer E3)

In the charged formulation in Production Example 1, isobutyl methacrylate was changed to n-hexyl methacrylate, and the charged amount of Pertetra A was changed to 0.22 g, and the nitrogen substitution was performed. The mixture was heated under agitation under a nitrogen flow (nitrogen gas: 50 mL/min) at a bath temperature of 95 to 105° C. After 2 hours, 30 g of the base oil for a polymerization solvent was added, followed by reacting for 7 hours. After allowing to stand overnight, the mixture was heated under agitation at a bath temperature of 95 to 105° C. for 3 hours, to which 135 g of the base oil for a polymerization solvent was added. The unreacted monomers were distilled off under reduced pressure (0.02 MPa or less) at a bath temperature increased to 120 to 130° C. over 2 hours, so as to provide a viscosity index improver composition (E-3) containing Polymer E3 shown in Table 1 below.

(4) Production Example 4 (Polymer E4)

In the charged formulation in Production Example 1, isobutyl methacrylate was changed to 2-ethylhexyl methacrylate, and the charged amount of Pertetra A was changed to 0.20 g, and the nitrogen substitution was performed. The mixture was heated under agitation under a nitrogen flow (nitrogen gas: 50 mL/min) at a bath temperature of 95 to 105° C. After 1 hour, 30 g of the base oil for a polymerization solvent was added, followed by reacting for 2 hours. 135 g of the base oil for a polymerization solvent was added, followed by heating under agitation for further 2 hours. After allowing to stand overnight, the mixture was heated under agitation at a bath temperature of 95 to 105° C. for 10 hours, and the unreacted monomers were distilled off under reduced pressure (0.02 MPa or less) at a bath temperature increased to 120 to 130° C. over 2 hours, so as to provide a viscosity index improver composition (E-4) containing Polymer E4 shown in Table 1 below.

(5) Comparative Production Example 1 (Polymer C1)

In a four-neck separable flask equipped with a thermometer, a Dimroth condenser, a vacuum-sealed agitator, a nitrogen flow inlet, and a nitrogen flow outlet, 7.70 g of the macromonomer (α), 5.60 g of n-butoxyethyl methacrylate, 11.20 g of nC1213MA, 45.50 g of n-butyl methacrylate, 23.7 g of the base oil for a polymerization solvent, and 0.40 g of Pertetra A were charged, and nitrogen substitution was performed. The mixture was heated under agitation under a nitrogen flow (nitrogen gas: 50 mL/min) at a bath temperature of 95 to 105° C. After 2 hours, 46.3 g of the base oil for a polymerization solvent was added, followed by reacting for 7 hours. Subsequently, 70 g of the base oil for a polymerization solvent was added, followed by heating under agitation for further 1 hour. After allowing to stand overnight, the mixture was heated under agitation at a bath temperature of 95 to 105° C. for 3 hours, to which 140 g of the base oil for a polymerization solvent was added. After heating under agitation for 1 hour, 350 g of the base oil for a polymerization solvent was added, followed by heating under agitation for 2 hours. The unreacted monomers were distilled off under reduced pressure (0.02 MPa or less) at a bath temperature increased to 120 to 130° C. over 2 hours, so as to provide a viscosity index improver composition (C-1) containing Polymer C1 shown in Table 1 below.

(6) Comparative Production Example 2 (Polymer C2)

In a four-neck separable flask equipped with a thermometer, a Dimroth condenser, a vacuum-sealed agitator, a nitrogen flow inlet, and a nitrogen flow outlet, 5.72 g of the macromonomer (α), 4.16 g of n-butoxyethyl methacrylate, 8.32 g of nC1213MA, 33.80 g of n-butyl methacrylate, 20 g of the base oil for a polymerization solvent, 0.0428 g of AMBN, and 0.0574 g of ADVN were charged, and nitrogen substitution was performed. The mixture was heated under agitation under a nitrogen flow (nitrogen gas: 50 mL/min) at a bath temperature of 75 to 85° C. After 2 hours, 188 g of the base oil for a polymerization solvent was added, followed by reacting for 16 hours. The unreacted monomers were distilled off under reduced pressure (0.02 MPa or less) at a bath temperature increased to 120 to 130° C. over 2 hours, so as to provide a viscosity index improver composition (C-2) containing Polymer C2 shown in Table 1 below.

The mass average molecular weights (Mw), the number average molecular weights (Mn), and the molecular weight distributions (Mw/Mn) of Polymers E1, E2, E3, E4, C1, and C2 are shown in Table 1. In Table 1, the glass transition temperature (Tg) is the glass transition temperature of the homopolymer of the monomer (A1).

TABLE 1

|  |  | Production Example 1 | Production Example 2 | Production Example 3 | Production Example 4 | Comparative Production Example 1 | Comparative Production Example 2 |
|---|---|---|---|---|---|---|---|
| Polymer | | E1 | E2 | E3 | E4 | C1 | C2 |
| Monomer (% by mass) *1 | nC4MA | — | — | — | — | 65 | 65 |
| | iC4MA | 65 | — | — | — | — | — |
| | cC6MA | — | 65 | — | — | — | — |
| | nC6MA | — | — | 65 | — | — | — |
| | 2-EHMA | — | — | — | 65 | — | — |
| | nC1213MA | 16 | 16 | 16 | 16 | 16 | 16 |
| | macro-monomer (α) | 11 | 11 | 11 | 11 | 11 | 11 |
| | BOEMA | 8 | 8 | 8 | 8 | 8 | 8 |
| Total amount of monomer (% by mass) | | 100 | 100 | 100 | 100 | 100 | 100 |
| Molecular weight | Mn | 419,161 | 546,902 | 478,883 | 287,954 | 349,745 | 231,990 |
| | Mw | 597,722 | 760,386 | 1,307,391 | 1,009,913 | 658,057 | 396,352 |
| | Mw/Mn | 1.43 | 1.39 | 2.73 | 3.51 | 1.88 | 1.71 |
| Glass transition temperature Tg (° C.) | | 53 | 80 | 10 | −10 | 20 | 20 |
| Viscosity index improver composition | | E-1 | E-2 | E-3 | E-4 | C-1 | C-2 |
| Polymer (% by mass) *2 | | 10.00 | 10.00 | 20.00 | 20.00 | 10.00 | 20.00 |
| Mineral oil (% by mass) *2 | | 90.00 | 90.00 | 80.00 | 80.00 | 90.00 | 80.00 |

*1 content of monomer in total amount 100% by mass of monomers (% by mass)
*2 content of component in total amount 100% by mass of viscosity index improver composition (% by mass)

Examples 1 to 4 and Comparative Examples 1 and 2

The viscosity index improver composition and the base oil (a mineral oil having a 100° C. kinematic viscosity of 4.2 mm²/s and a viscosity index of 123) in the formulations shown in Table 2, so as to prepare Lubricating oil compositions EC-1, EC-2, EC-3, EC-4, CC-1, and CC-2 having a 100° C. kinematic viscosity regulated to around 7.5 mm²/s. The lubricating oil compositions each were measured for the 40° C. kinematic viscosity, the 100° C. kinematic viscosity, the viscosity index, the CCS viscosity at −30° C., the CCS viscosity at −35° C., the HTHS viscosity at 80° C., the HTHS viscosity at 100° C., and the HTHS viscosity at 150° C.

The measurement results are shown in Table 2. In Table 2, the numerals in parentheses each are the content in terms of resin in the viscosity index improver composition. For evaluating the extent of the HTHS viscosity assuming the constant 100° C. kinematic viscosity of the lubricating oil composition, values each obtained by dividing the HTHS viscosities at the temperatures by the 100° C. kinematic viscosity ($KV_{100}$) of the lubricating oil composition are shown in Table 2.

TABLE 2

|  |  | Example 1 | Example 2 | Example 3 | Example 4 | Comparative Example 1 | Comparative Example 2 |
|---|---|---|---|---|---|---|---|
| Lubricating oil composition | | EC-1 | EC-2 | EC-3 | EC-4 | CC-1 | CC-2 |
| Composition (% by mass) | Base oil | 80.85 | 83.85 | 94.76 | 94.59 | 71.00 | 82.76 |
| | C-1 | — | — | — | — | 29.00 (2.900) | — |
| | C-2 | — | — | — | — | — | 17.24 (3.449) |
| | E-1 | 19.15 (1.915) | — | — | — | — | — |
| | E-2 | — | 16.15 (1.615) | — | — | — | — |
| | E-3 | — | — | 5.24 (1.048) | — | — | — |
| | E-4 | — | — | — | 5.41 (1.081) | — | — |
| Properties | 40° C. Kinematic viscosity (mm²/s) | 22.09 | 22.64 | 24.30 | 31.00 | 22.79 | 23.90 |
| | 100° C. Kinematic viscosity (mm²/s) | 7.519 | 7.475 | 7.517 | 7.563 | 7.474 | 7.553 |
| | Viscosity index | 350 | 336 | 309 | 227 | 333 | 318 |
| | CCS (−30° C.), mPa · s | 1,620 | 1,550 | 1,520 | 1,590 | 1,640 | 1,680 |
| | CCS (−35° C.), mPa · s | 2,950 | 2,970 | 2,820 | 3,000 | 3,050 | 3,200 |
| | HTHS (80° C.), mPa · s | 5.50 | 5.37 | 5.57 | 5.76 | 5.72 | 5.86 |
| | HTHS (100° C.), mPa · s | 3.75 | 3.67 | 3.77 | 3.83 | 3.77 | 4.01 |
| | HTHS (150° C.), mPa · s | 2.31 | 2.10 | 1.95 | 1.94 | 2.63 | 2.82 |
| | HTHS (80° C.)/$KV_{100}$ | 0.731 | 0.718 | 0.741 | 0.762 | 0.765 | 0.776 |
| | HTHS (100° C.)/$KV_{100}$ | 0.499 | 0.491 | 0.502 | 0.506 | 0.504 | 0.531 |
| | HTHS (150° C.)/$KV_{100}$ | 0.307 | 0.281 | 0.259 | 0.257 | 0.352 | 0.373 |

Figure 1:
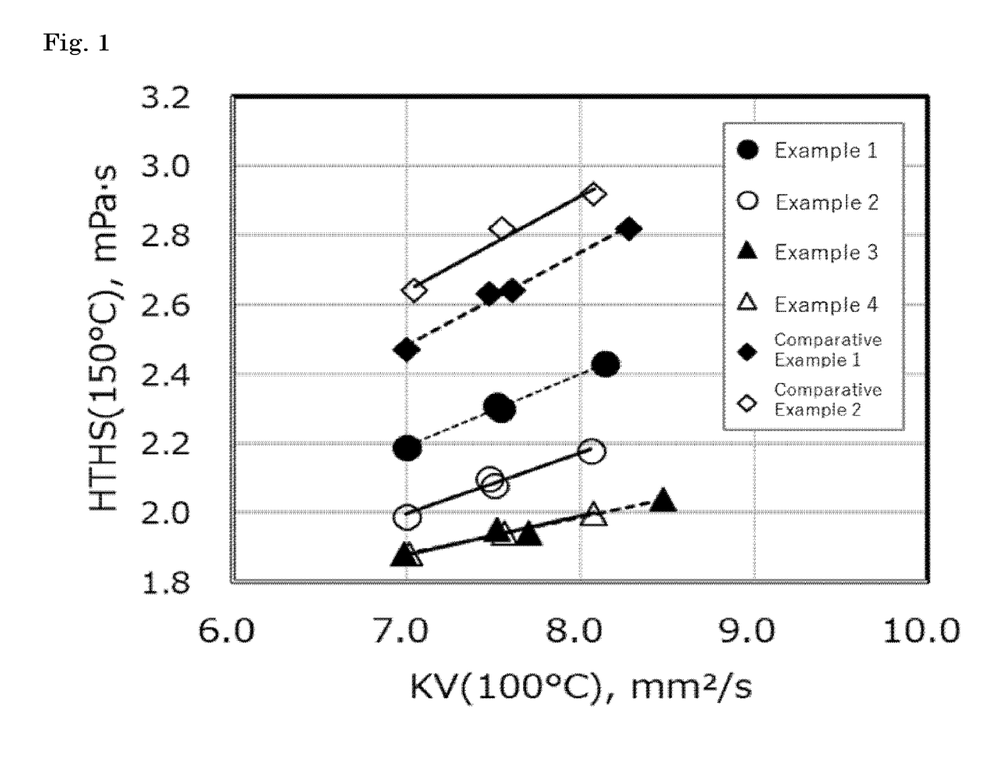
FIG. 1 is a graph in which the HTHS viscosity (150° C.) is plotted against the 100° C. kinematic viscosity (KV 100° C.) for the lubricating oil compositions of Examples 1 to 4 and Comparative Examples 1 and 2.
Figure 2:
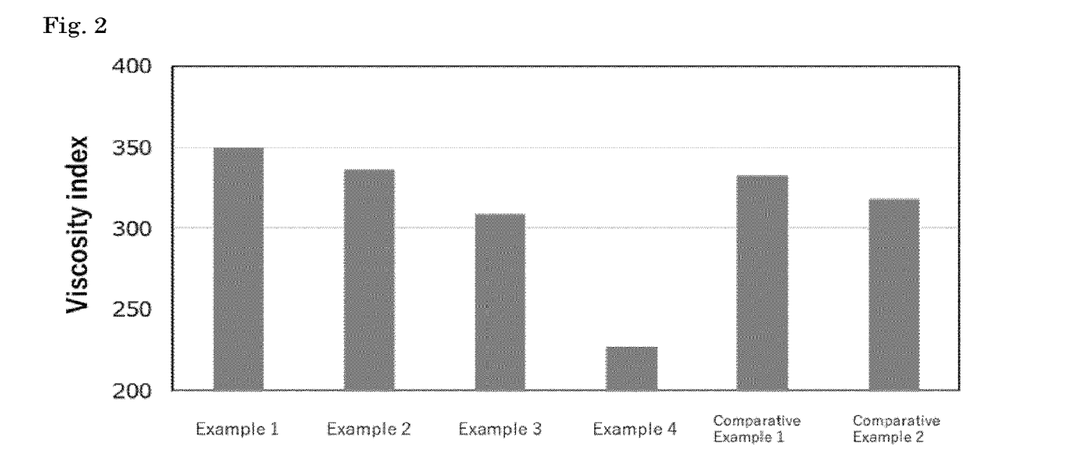
FIG. 2 is a chart showing the viscosity indices of the lubricating oil compositions of Examples 1 to 4 and Comparative Examples 1 and 2.

FIG. 1 is a graph in which the change of the HTHS viscosity at 150° C. is plotted against the 100° C. kinematic viscosity for the lubricating oil compositions of Examples 1 to 4 and Comparative Examples 1 and 2, and FIG. 2 is a chart showing the viscosity indices of the lubricating oil compositions of Examples 1 to 4 and Comparative Examples 1 and 2. The 100° C. kinematic viscosity of the lubricating oil composition was regulated by the amount of the viscosity index improver composition mixed therein.

It is understood from the results in FIG. 1 that in the comparison assuming the same 100° C. kinematic viscosity, the HTHS viscosity at 150° C. can be decreased in the case where $R^{14}$ in the general formula (a1) represents an isobutyl group, a cyclohexyl group, a n-hexyl group, or a 2-ethylhexyl group, as compared to the case where $R^{14}$ represents a n-butyl group, and in particular it is understood therefrom that the effect is conspicuous in the case where $R^{14}$ represents a n-hexyl group or a 2-ethylhexyl group.

It is understood from the results in FIG. 2 that the viscosity index can be improved in the case where $R^{14}$ in the general formula (a1) represents an isobutyl group or a cyclohexyl group, as compared to the case where $R^{14}$ represents a n-butyl group.

Accordingly, it is understood from the comprehensive evaluation of the values obtained by dividing the HTHS viscosities at the temperatures by the 100° C. kinematic viscosity ($KV_{100}$) of the lubricating oil composition shown in Table 2 that in the comparison assuming the same 100° C. kinematic viscosity of the lubricating oil composition regulated by mixing the viscosity index improver, $R^{14}$ in the general formula (a1) preferably represents a n-hexyl group or a 2-ethylhexyl group from the standpoint of regulating the HTHS viscosity in the effective temperature range to a low level while regulating the HTHS viscosity at 150° C. to a lower level. It is also understood therefrom that in the comparison assuming the same 100° C. kinematic viscosity of the lubricating oil composition regulated by mixing the viscosity index improver, $R^{14}$ preferably represents an isobutyl group or a cyclohexyl group from the standpoint of improving the viscosity index while regulating the HTHS viscosity at 150° C. to a low level and regulating the HTHS viscosity in the effective temperature range of the lubricating oil composition to a lower level.

It is further understood that in the comparison assuming the same 100° C. kinematic viscosity of the lubricating oil composition regulated by mixing the viscosity index improver, $R^{14}$ in the general formula (a1) preferably represents an isobutyl group or a cyclohexyl group from the standpoint of facilitating the regulation of the HTHS viscosity at 100° C. to a low level.

The invention claimed is:

1. A viscosity index improver composition, comprising a comb-shaped polymer (A) comprising a structural unit derived from a macromonomer (α) and a structural unit derived from a monomer (A1) represented by the following general formula (a1):

(a1)

wherein in the general formula (a1):
$R^{11}$ represents a hydrogen atom or a methyl group;
$R^{12}$ represents a single bond, —O—, or —NH—;
$R^{13}$ represents a linear alkylene group having 2 to 4 carbon atoms or a branched alkylene group having 2 to 4 carbon atoms;
m1 represents an integer of 0 to 20, in which in the case where m1 represents an integer of 2 or more, plural groups represented by $R^{13}$ may be the same as or different from each other, and the $(R^{13}O)_{m1}$ moiety may be either random copolymerization or block copolymerization; and
$R^{14}$ represents an alkyl group having 4 to 8 carbon atoms except for a n-butyl group, and
wherein the macromonomer (α) has a (meth)acryloyl group at one end, and has a structural unit derived from one or more kinds of a monomer (α1) selected from butadiene and hydrogenated butadiene.

2. The viscosity index improver composition according to claim 1, wherein the comb-shaped polymer (A) has a content of the structural unit derived from the monomer (A1) of 60% by mass or more based on the total structural units.

3. The viscosity index improver composition according to claim 1, wherein the comb-shaped polymer (A) further comprises a structural unit derived from a monomer (A2) represented by the following general formula (a2):

(a2)

wherein in the general formula (a2):
$R^{21}$ represents a hydrogen atom or a methyl group;
$R^{22}$ represents a single bond, —O—, or —NH—;
$R^{23}$ represents a linear alkylene group having 2 to 4 carbon atoms or a branched alkylene group having 2 to 4 carbon atoms;
m2 represents an integer of 1 to 20, in which in the case where m2 represents an integer of 2 or more, plural groups represented by $R^{23}$ may be the same as or different from each other, and the $(R^{23}O)_{m2}$ moiety may be either random copolymerization or block copolymerization; and
$R^{24}$ represents a linear alkyl group having 1 to 12 carbon atoms or a branched alkyl group having 1 to 12 carbon atoms.

4. The viscosity index improver composition according to claim 1, wherein the comb-shaped polymer (A) further comprises a structural unit derived from an alkyl (meth)acrylate (A3) having a linear alkyl group having 10 to 30 carbon atoms or a branched alkyl group having 10 to 30 carbon atoms.

5. The viscosity index improver composition according to claim 1, wherein the comb-shaped polymer (A) has a mass average molecular weight (Mw) of 300,000 or more and 1,500,000 or less.

6. The viscosity index improver composition according to claim 1, wherein the comb-shaped polymer (A) has a molecular weight distribution (Mw/Mn) of 1.2 or more and 3.7 or less.

7. A lubricating oil composition comprising the viscosity index improver composition according to claim 1 and a base oil.

8. The viscosity index improver composition according to claim 1, wherein the macromonomer (α) is a high molecular weight monomer having a number average molecular weight of 300 or more, and 100,000 or less.

* * * * *